United States Patent [19]

Reichel et al.

[11] Patent Number: 4,765,809
[45] Date of Patent: Aug. 23, 1988

[54] APPARATUS FOR REMOVING DUST FROM GAS

[75] Inventors: Dieter Reichel, Aschaffenburg; Rudolf Jakobs, Bad Homburg; Lothar Brehm; Gunter Quass, both of Frankfurt am Main, all of Fed. Rep. of Germany

[73] Assignee: Metallgesellschaft Aktiengesellschaft, Frankfurt am Main, Fed. Rep. of Germany

[21] Appl. No.: 71,847

[22] Filed: Jul. 10, 1987

[30] Foreign Application Priority Data

Jul. 10, 1986 [DE] Fed. Rep. of Germany ....... 3623147

[51] Int. Cl.⁴ ............................................ B01D 51/00
[52] U.S. Cl. ........................................ 55/267; 55/378; 55/410; 55/341.1; 422/240; 422/242
[58] Field of Search ............. 55/267, 341 R, 341 NT, 55/378, 341 HM, 334, 410; 422/240, 241, 242

[56] References Cited

U.S. PATENT DOCUMENTS 2,804,168 8/1957 Church .................................. 55/334
4,158,554 6/1979 Bundy et al. ...................... 55/341 R Primary Examiner—Bernard Nozick
Attorney, Agent, or Firm—Herbert Dubno

[57] ABSTRACT

For collection of dust from gases at temperatures up to 900° C. and under presssures up to 20 bars by means of gas-permeable two-dimensional filter elements, an apparatus is proposed which comprises a pressure-resisting cylindrical outer housing, which contains a gas-tight pear-shaped inner housing, which is movably mounted in the outer housing by a means of a heat-insulating carrying structure and is provided with a tubular gas-outlet port and comprises a cambered bottom, which contains cylindrical filter elements. A pressure-confining gas-tight compensator is provided between the tubular gas-outlet port of the inner housing and the outer housing. Because the "pressure-confining" and "supporting" functions are separate, the internal components, which will be subjected to temperatures up to 900° C., can be joined to the pressure-confining wall of the outer housing, which must not be heated above 200° C.

7 Claims, 3 Drawing Sheets

APPARATUS FOR REMOVING DUST FROM GAS

FIELD OF THE INVENTION

Our present invention relates to an apparatus for collecting dust from gas at a temperature up to 900° C. and under a pressure up to 20 bars by means of gas-permeable two-dimensional filter elements.

BACKGROUND OF THE INVENTION

In an effort to improve the thermal efficiency of power plants, combined plants have been designed in which the energy of hot combustion gases is utilized primarily in gas turbines and secondarily in steam turbines. In such plants, the fuels are reacted with air under elevated pressure so that an adequate pressure drop is available for the gas turbine.

In all processes in which chemically bound energy is converted to mechanical and/or electric energy by a combustion, the efficiency will ultimately depend on the maximum temperatures at which the available materials can be used.

On the other hand, it is known that the $NO_x$ content of the exhaust gases, i.e. the pollution of the environment, will increase with the combustion temperature.

For this reason, it has already been proposed to burn, particulate fuel in a stationary or circulating fluidized bed. In that case, the difference between the highest temperature which occurs and the highest temperature which can be utilized in the process can be kept much smaller than in conventional combustors. But the hot exhaust gases from fluidized bed combustors necessarily contain substantial quantities of dust, which can effect erosion in gas turbines and for this reason, must be previously removed from the gas before.

Apparatuses for collecting dust from gases at temperatures up to 900° C. and under pressure up to 20 bars are required for such and other purposes.

In particular, dust can be collected by means of gas-permeable two-dimensional filter elements. Such filter elements consist in most cases of cylinders, which are closed at the bottom, and a plurality of such filter elements are suspended from a common plate. While such filters are conventionally described as "bag filters", that term is not used for high temperature filters, where the filter elements are rigid rather than flexible.

The flow of gas through such filter elements is intermittently interrupted and the filter elements are then cleaned by pure gas flowing through the filter element in the opposite direction.

When such filter elements are used under the conditions described, the filter elements cannot be inserted in the usual manner in a flat tube plate because the tube plate must be designed to withstand a differential pressure up to 0.2 bars in both directions (operation/cleaning) and to take up the weight of the filter elements at 900° C.

Besides, the tube plate must be joined to the outer housing and the pressure-confining wall of that housing must not be subjected to temperatures in excess of 200° C. if impermissible heat losses are to be avoided and economically ustifiable materials can be used.

Calculations have shown that the resulting temperature difference of 700° C. so high that it does not permit a gas-tight joint be made between a tube plate and the pressure-confining wall of the outer housing. A water-cooled tube plate would involve a disadvantage because it necessarily involves heat losses and it has been found practically that this approach cannot be used to solve the structural problem which arises.

OBJECT OF THE INVENTION

It is an object of our invention to provide an apparatus which serves to collect dust from gases at temperatures up to 900° C. and under pressures up to 20 bars by means of gas-permeable two-dimensional filter elements and in which the filter elements can be disposed in the gas stream for a reliable operation and without the above-mentioned disadvantages involved in the use of a conventional tube plate.

SUMMARY OF THE INVENTION

This object and others are attained in an apparatus for separating dust from gas at a high temperature and pressure which comprises:

A pressure-resisting cylindrical housing, to which a conical dust-collecting bin is joined at the bottom of the housing and which has a cambered cover and a cylindrical top extension. The housing is provided on the inside with a heat-insulating brick liner and on the outside with a layer of thermal insulation and comprises a gas inlet in its lower portion and an upper horizontal gas outlet in its cylindrical top extension.

(b) A gas-tight pear-shaped inner housing, which is movably mounted in the housing by means of a heat-insulating carrying structure and is provided with a tubular gas-outlet port and comprises a cambered bottom in which cylindrical filter elements are secured.

(c) A gas-tight compensator disposed between the tubular gas-outlet port of the inner housing and the gas outlet of the housing.

According to the invention, the top cylindrical top extension of the housing is closed by a screwed-on cover and the inner housing is closed by a welded-on cover which is U-shaped in cross-section.

Advantageously, the housing comprises an elongate neck so that the housing can repeatedly be opened and closed and the seam weld can be ground off and a cover again joined by welding to the neck.

The housing can be centered and movably mounted by means of lugs on three U-shaped supports which are uniformly peripherally spaced apart and provided by a cylindrical carrying element centered and movably mounted by means of other lugs in U-shaped supports of the outer housing.

Heat-insulating materials can be provided between the lugs and the supports.

The cylindrical filter elements can be secured in conical sockets in the bottom of the housing by means of rings and wedges and with interposed sealing means.

The compensator can be gas-tightly secured by welding to the tubular gas-outlet port and the gas outlet and is designed to reduce to a non-critical value the heat transfer from the tubular gas-outlet port to the gas outlet.

The crux of the invention resides in that the conventional tube plate for receiving the filter elements is replaced by a gas-tight pear-shaped inner housing, which is movably mounted in the outer housing by a heat-insulating carrying structure.

As a result, the "supporting" and "sealing" functions can be separated from each other so that the difficulties which result from the high temperature difference between the outer housing and the internal components can be overcome.

BRIEF DESCRIPTION OF THE DRAWING above objects, features and advantages of our invention will become more readily apparent from the following description, reference being made to the accompanying drawing in which.

DESCRIPTION

Figure 1:
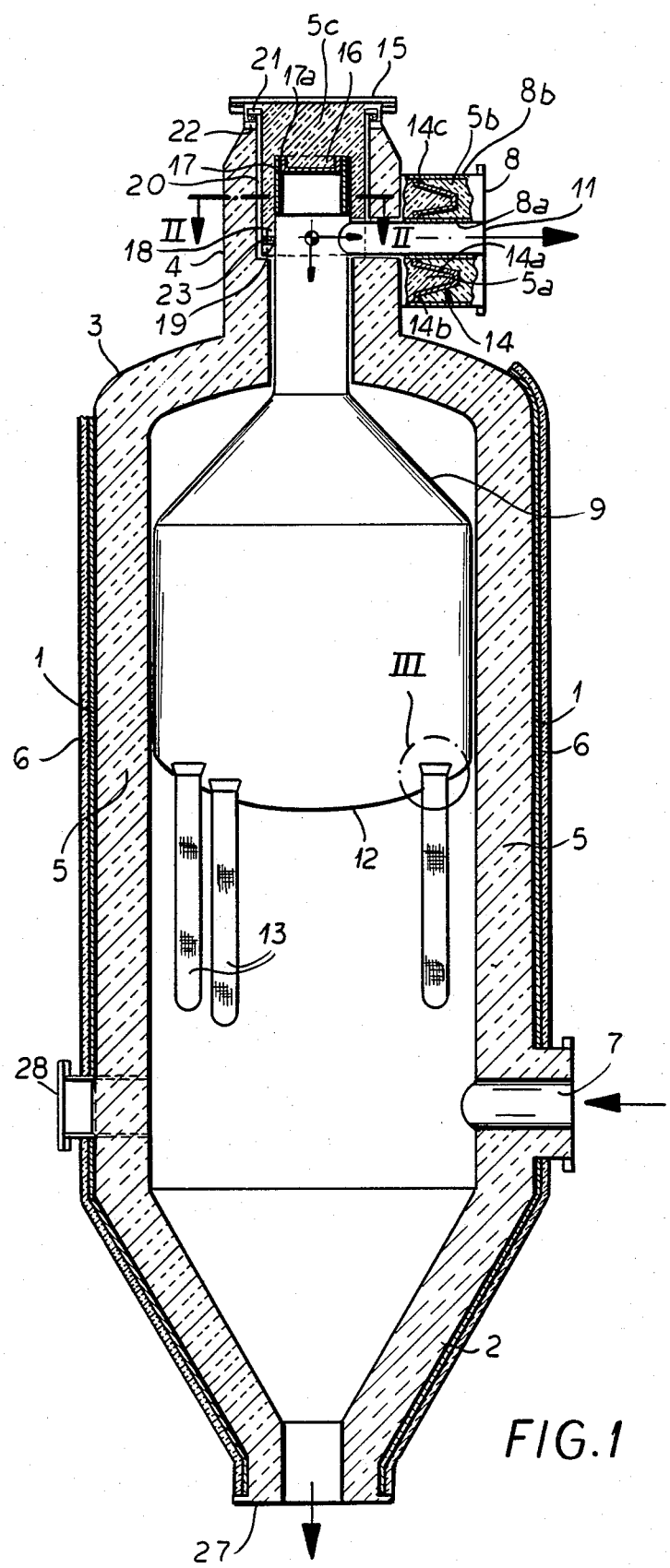
FIG. 1 is a vertical longitudinal sectional view showing an apparatus in accordance with the invention.

The apparatus shown in FIG. 1 essentially comprises a cylindrical housing 1, which is provided with a dust-collecting bin 2 joined to the bottom of the housing 1, which comprises a cambered cover 3 and a cylindrical top extension 4 and which is provided on the inside with a heat-insulating brick lining 5 and on the outside with a layer 6 of insulation.

The housing 1 is provided at its lower portion with a gas inlet 7 and is provided in the cylindrical top extension 4 with an upper horizontal gas outlet 8.

The apparatus also comprises a gas-tight pear-shaped inner housing 9, which is movably mounted in the housing 1 by means of a heat-insulating carrying structure 18 to 22 and is provided with a tubular gas-outlet port 11 and comprises a cambered bottom 12, in which cylindrical filter elements 13 are secured.

A gas-tight compensator 14 is disposed between the tubular gas-outlet port 11 of the inner housing 9 and the gas outlet 8.

The compensator 14 can include a single-fold bellows 14a whose outer edge 14b is welded to the tubular casing 8a of the outlet fitting 8 while its inner edge 14c is welded to the inner casing 11a forming the outlet pipe extending from the inner housing and forming a gas outlet port. The pipe 11 passes through the outlet 4a for the extension 4. Insulation masses are provided at 5a and 5b on opposite sides of this bellows fold 14a.

The inner housing 9 is centered and movably mounted by means of lugs 18 in three peripherally uniformly spaced-apart, U-shaped supports 19 provided by a cylindrical carrying element 20. The latter is centered and movably mounted by means of lugs 21 in U-shaped supports 22 provided by the housing 1. Heat-insulating materials 23 are disposed between the lugs 18, 21 and the supports 19, 22.

As a result, the inner housing 9 can be supported by and centered in the outer housing 1 in spite of the high temperature difference of up to 700° C. whereas the thermal expansion of the inner housing 9 in vertical and horizontal directions will not be obstructed. This is also true for the tubular gas-outlet port 11, which is secured to the housing 9 and which by the compensator 14 is gas-tightly connected to the gas outlet 8 of the outer housing 1.

It is sufficient that the compensator 14 ensure a gas tightness and a decrease of the heat transfer to a non-critical value, since the compensator need not support the filter elements.

On the other hand, as the inner housing 9 as well as the compensator 14 are subjected on the inside and outside to the same pressure, with the exception of the pressure difference that is due to the pressure drop across the filter elements 13, the inner housing 9 will have to be designed in consideration only of its function to support the filter elements and to ensure a gas-tight seal whereas substantial stresses which would be due to pressure differences need not be taken into account in that design.

The differential pressure between the gas and the environment is applied to the compensator 14. The inner housing 9 and the filter elements 13 are supported by means of the heat-insulating carrying structure 18 to 22. As a result, the pressure-confining and "supporting" functions are performed by different structures so that the design difficulties described have been overcome.

The inner housing 9 is closed by a welded-on cover 16, which is U-shaped in cross section.

The cylindrical top extension of the housing 1 is closed by a screwed-on cover.

The housing 9 has an elongate neck 17, so that the housing 9 can repeatedly be opened and closed in that the seam weld 17a is ground off and a cover 16 is again joined by welding.

The covers 15 and 16 close a service opening, which is accessible from above and which is required for the introduction of the filter elements 13 and possibly for their replacement.

The interior volume of the cylindrical top extension 4 and of the upper horizontal gas outlet is filled with insulating material 5c. The housing 1 also has a service opening 28 and in its lower portion a dust outlet 27.

Figure 2:
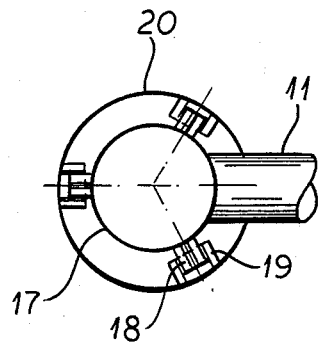
FIG. 2 is a horizontal sectional view taken along the line II—II of FIG. 1.

FIG. 2 is a horizontal section view taken along the line II—II of FIG. 1. The cylindrical carrying element 20 and the elongate neck 17 of the inner housing 9 are represented by concentric circles, The horizontal tubular gas-outlet port 11 branches from the elongate neck 17. Three lugs 18, which are regularly peripherally spaced apart, U-shaped supports 19 of the cylindrical carrying element. As a result, the housing 9 is movably mounted and centered and its thermal expansion in a horizontal direction will not be obstructed.

Figure 3:
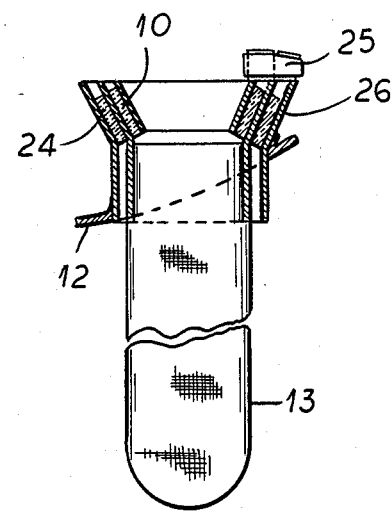
FIG. 3 is an enlarged view of the detail III of FIG. 1.
Figure 4:
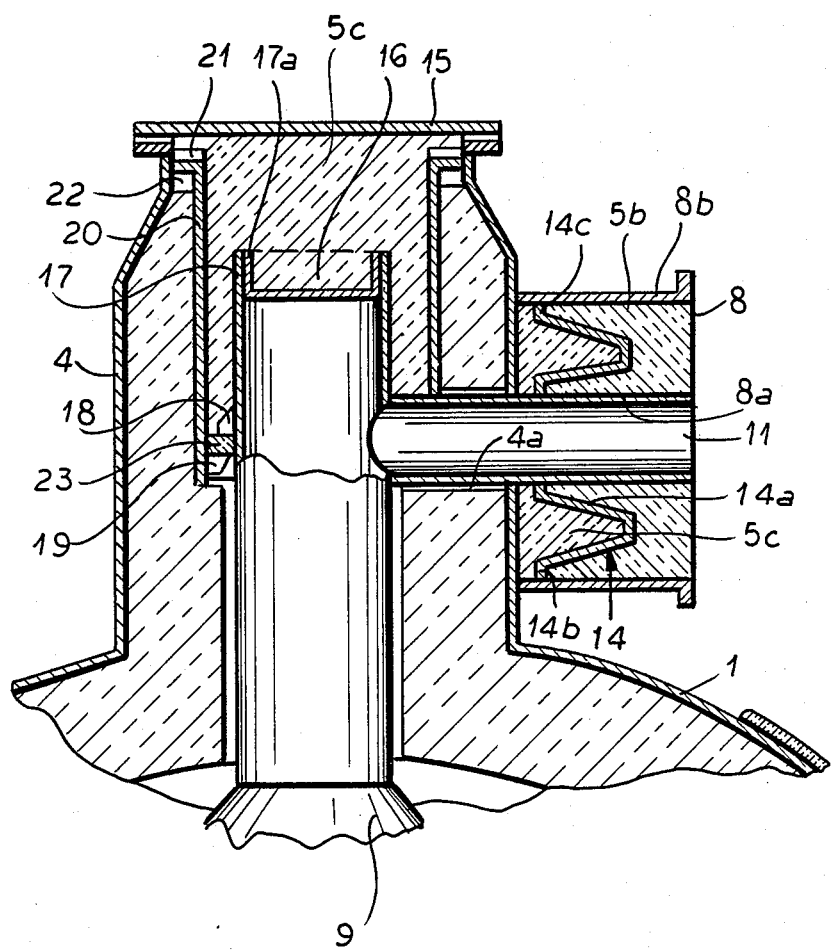
FIG. 4 is a detail view of the outlet region of the apparatus.

As can be seen from FIG. 3, the cylindrical filter elements 13 are closed at the bottom and at their top end have a conical extension and said extensions are secured in conical sockets 26 in the bottom 12 of the housing 9 by means of rings 10 and wedges 25 and with sealing rings 24 of thermal insulation interposed. This ensures a reliable fixation of the filter elements 13 in the bottom 12 so that a gas-tightness will be ensured even under changing operating conditions.

We claim:

1. An apparatus for collecting dust from a high-temperature, high-pressure gas, comprising:
 a pressure-resistant cylindrical outer housing formed at a bottom thereof with a dust-collecting bin and an inlet for gas above said bin, said housing being formed with a cambered cover, a heat-insulating internal liner and a heat-insulating outer layer;
 means forming a cylindrical extension extending upwardly from an upper portion of said housing and provided with a horizontal gas outlet;
 a gas-tight pear-shaped inner housing provided with a tubular gas-outlet port extending in said gas outlet, a cambered bottom, and a plurality of cylindrical filter elements extending from said bottom of said inner housing downwardly within said outer housing;
 a heat-insulating carrier structure supporting said inner housing with said outer housing; and a gas-tight compensator disposed between said port and said outlet.

2. The apparatus defined in claim 1 wherein said filter elements are secured in conical sockets in the bottom of said inner housing by wedges and rings with interposed seals.

3. The apparatus defined in claim 1 wherein said compensator is secured gas-tightly by welding to the tubular gas-outlet port and the gas outlet and is designed to reduce to a non-critical value the heat transfer from the tubular gas-outlet port to the gas outlet.

4. The apparatus defined in claim 1, further comprising an outer housing cover attached by theaded members to said extension to close the same and a U-section cover welded onto said inner housing above said port.

5. The apparatus defined in claim 4 wherein said inner housing has an elongate neck of sufficient length to allow repeated grinding of a weld seam joining said U-section cover to said inner housing and the welding of another cover to said inner housing.

6. The apparatus defined in claim 1 wherein said heat-insulating carrying structure comprises a cylindrical carrying element centered and movably mounted by means of lugs on its outside in U-shaped supports of the outer housing, said cylindrical carrying element having U-shaped supports on its inside for carrying lugs fastened to the outside of the inner housing.

7. The apparatus defined in claim 6 wherein heat-insulating materials are interposed between the lugs and the respective supports.

* * * * *